(12) United States Patent
Ghosh et al.

(10) Patent No.: US 9,974,045 B2
(45) Date of Patent: May 15, 2018

(54) SYSTEMS AND METHODS FOR CONTEXTUAL DISCOVERY OF DEVICE FUNCTIONS

(71) Applicant: Google Inc., Mountain View, CA (US)

(72) Inventors: Angana Ghosh, Sunnyvale, CA (US); Maurice K. Chu, Mountain View, CA (US)

(73) Assignee: Google LLC, Mountain View, CA (US)

(*) Notice: Subject to any disclaimer, the term of this patent is extended or adjusted under 35 U.S.C. 154(b) by 129 days.

(21) Appl. No.: 14/754,391

(22) Filed: Jun. 29, 2015

(65) Prior Publication Data
US 2016/0381658 A1 Dec. 29, 2016

(51) Int. Cl.
| | | |
|---|---|---|
| *H04W 68/00* | (2009.01) | |
| *H04L 29/08* | (2006.01) | |
| *H04W 4/02* | (2018.01) | |
| *H04W 4/18* | (2009.01) | |
| *G06F 9/44* | (2018.01) | |
| *G06Q 30/02* | (2012.01) | |
| *H04M 1/725* | (2006.01) | |

(52) U.S. Cl.
CPC ........ *H04W 68/005* (2013.01); *G06F 9/4446* (2013.01); *G06F 9/453* (2018.02); *G06Q 30/02* (2013.01); *H04L 67/22* (2013.01); *H04M 1/72569* (2013.01); *H04W 4/02* (2013.01); *H04W 4/18* (2013.01)

(58) Field of Classification Search
CPC .................................................. H04W 68/005
See application file for complete search history.

(56) References Cited

U.S. PATENT DOCUMENTS

| | | |
|---|---|---|
| 8,464,248 B2 | 6/2013 | Moffatt et al. |
| 8,676,742 B2 | 3/2014 | Flinn et al. |
| 2005/0105467 A1* | 5/2005 | True ............... H04M 15/42 370/235 |
| 2010/0205541 A1* | 8/2010 | Rapaport .......... G06Q 10/10 715/753 |

(Continued)

FOREIGN PATENT DOCUMENTS

EP 2755118 A1 7/2014

OTHER PUBLICATIONS

PCT/US2016/039993 International Search Report and Written Opinion dated Sep. 5, 2016.

*Primary Examiner* — Mazda Sabouri
(74) *Attorney, Agent, or Firm* — Colby Nipper (57) ABSTRACT

Certain implementations of the disclosed technology may include systems and methods for providing notifications relating to context-based features of a mobile device. According to an example implementation, a method is provided for receiving an indication of contextual information and an indication of historical information. The method also includes determining an environmental context of the mobile device from the contextual information and the historical information. The method also includes determining whether a usage criteria associated with a context-based feature associated with the environmental context has been met. The method also includes outputting an indication of the determination that the context-based feature has not met the usage criteria, such that the mobile device outputs a notification related to the context-based feature.

22 Claims, 4 Drawing Sheets

(56) References Cited

U.S. PATENT DOCUMENTS

| | | | |
|---|---|---|---|
| 2010/0277326 A1* | 11/2010 | Berk | G06F 11/3013 340/636.11 |
| 2011/0106736 A1* | 5/2011 | Aharonson | G06Q 10/109 706/12 |
| 2012/0042036 A1 | 2/2012 | Lau et al. | |
| 2013/0254194 A1* | 9/2013 | Hadatsuki | H04M 1/72569 707/736 |
| 2013/0346877 A1* | 12/2013 | Borovoy | H04L 65/403 715/753 |
| 2014/0188956 A1 | 7/2014 | Subba et al. | |
| 2015/0281156 A1* | 10/2015 | Beausoleil | H04L 51/14 709/206 |
| 2016/0078350 A1* | 3/2016 | Yarvis | G06Q 30/0631 706/11 |
| 2016/0164974 A1* | 6/2016 | Lavee | G06F 17/30867 707/722 |

* cited by examiner

SYSTEMS AND METHODS FOR CONTEXTUAL DISCOVERY OF DEVICE FUNCTIONS

BACKGROUND

Computing devices, such as mobile phones, may contain a number of features, functionalities, and applications designed to provide increased utility to a user of the computing device. In some such computing devices, features may be continually added as operating systems or applications receive updates. In some situations, features, functionalities, and applications of a computing device may be so plentiful and new that a user may be ignorant of them even when they would be useful to the user. As such, a user may have difficulty in achieving awareness of features that the user would otherwise desire to use. Additionally, certain functionalities, features, and applications of a computing device may only be useful in a particular context, such as in a particular situation or for a user with a particular set of needs. Thus, it may require substantial effort on the part of a user to learn and remember various new and legacy features of the computing device. Further, it may require substantial additional time and effort on the part of the user to then determine which of those features or applications, and under what circumstances, the features or applications may be useful.

BRIEF DESCRIPTION OF THE FIGS.

Reference will now be made to the accompanying FIGS., which are not necessarily drawn to scale, and wherein.

DETAILED DESCRIPTION

Some implementations of the disclosed technology will be described more fully with reference to the accompanying drawings. This disclosed technology may, however, be embodied in many different forms and should not be construed as limited to the implementations set forth herein.

Example implementations of the disclosed technology can provide systems and methods for notifying a user of a mobile computing device about a feature of the device or application for use with the device that the user may find useful but is otherwise unaware. In particular, the disclosed systems and methods may notify a user of a mobile device about a feature or application of the device that may be useful to the user in a given context. For example, the system may notify a user about an application designed to allow Bluetooth sharing of files if the system observes that the user is attempting to email files to friends who are located nearby. Upon learning of the Bluetooth sharing application, the user may be able to more efficiently share files with friends. According to some implementations, the system may notify the user of the feature or application only if the user has not previously accessed the feature or application. Thus, the disclosed technology can be useful for informing users of mobile devices about relevant features and applications of which the user is unaware. Implementations of the disclosed technology may also provide the user with tutorials of the context-based feature or application and allow the user to activate the feature or application upon notification.

Certain implementations of the disclosed technology may provide convenient methods for determining a mobile device's environmental context and notifying a user of a feature or application that may be useful in relation to that particular environmental context. For example, computing devices may have a variety of sensors and transceivers that may be monitored to collect data that can be used in deriving the mobile device's environmental context. Further, a computing device can also monitor signals from applications running on the computing device, such as, for example, web browsers, text messaging, email applications, and others for information that may be used in addition to sensor data in deriving the environmental context of the device. According to some implementations, if the environmental context of the mobile device is known, the system of the disclosed technology can notify the user about features and applications that are pertinent to the user's current situation or circumstances.

Thus, the disclosed technology may provide notifications to a user that allow a user to learn about various new and legacy features of a mobile device in situations in which a particular feature or application may be useful to the user. As will be appreciated, by notifying the user of a capability or context-based feature of the device appropriate to the current context, a user is more likely to appreciate the usefulness of the feature and may gain greater knowledge and utilization of the features of the mobile device.

Example implementations of the disclosed technology will now be described with reference to the accompanying figures.

Figure 1:
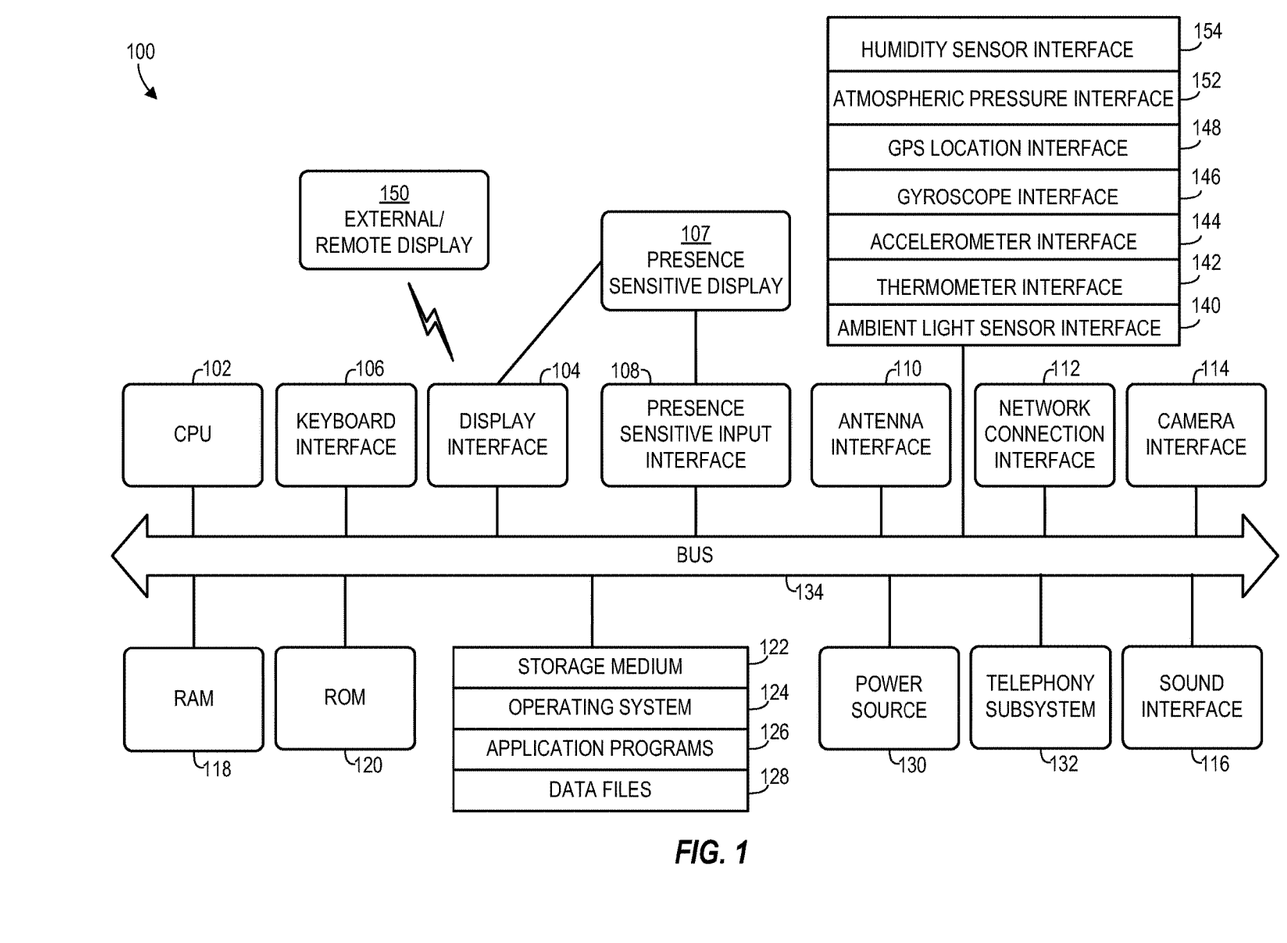
FIG. 1 depicts computing system architecture 100, according to an example implementation of the disclosed technology.

As desired, implementations of the disclosed technology may include a computing device with more or less of the components illustrated in FIG. 1. It will be understood that the computing device architecture 100 is provided for example purposes only and does not limit the scope of the various implementations of the present disclosed systems, methods, and computer-readable mediums.

The computing device architecture 100 of FIG. 1 includes a central processing unit (CPU) 102, where computer instructions are processed; a display interface 104 that supports a graphical user interface and provides functions for rendering video, graphics, images, and texts on the display. In certain example implementations of the disclosed technology, the display interface 104 may be directly connected to a local display, such as a touch-screen display associated with a mobile computing device. In another example implementation, the display interface 104 may be configured for providing data, images, and other information for an external/remote display 150 that is not necessarily physically connected to the mobile computing device. For example, a desktop monitor may be utilized for mirroring graphics and other information that is presented on a mobile computing device. In certain example implementations, the display interface 104 may wirelessly communicate, for example, via a Wi-Fi channel or other available network connection interface 112 to the external/remote display.

In an example implementation, the network connection interface 112 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device architecture 100 may include a keyboard interface 106 that provides a communication interface to a physical or virtual keyboard. In one example implementation, the computing device architecture 100 may include a presence-sensitive display interface 108 for connecting to a presence-sensitive display 107. According to certain example implementations of the disclosed technology, the presence-sensitive input interface 108 may provide a communication interface to various devices such as a pointing device, a capacitive touch screen, a resistive touch screen, a touchpad, a depth camera, etc. which may or may not be integrated with a display.

The computing device architecture 100 may be configured to use one or more input components via one or more of input/output interfaces (for example, the keyboard interface 106, the display interface 104, the presence sensitive input interface 108, network connection interface 112, camera interface 114, sound interface 116, etc.,) to allow the computing device architecture 100 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, an input component may be integrated with the computing device architecture 100 or may be a separate device. As additional examples, input components may include an accelerometer, a magnetometer, a digital camera, a microphone, and an optical sensor.

Example implementations of the computing device architecture 100 may include an antenna interface 110 that provides a communication interface to an antenna; a network connection interface 112 may support a wireless communication interface to a network. As mentioned above, the display interface 104 may be in communication with the network connection interface 112, for example, to provide information for display on a remote display that is not directly connected or attached to the system. In certain implementations, a camera interface 114 is provided that acts as a communication interface and provides functions for capturing digital images from a camera. In certain implementations, a sound interface 116 is provided as a communication interface for converting sound into electrical signals using a microphone and for converting electrical signals into sound using a speaker. According to example implementations, a random access memory (RAM) 118 is provided, where computer instructions and data may be stored in a volatile memory device for processing by the CPU 102.

According to an example implementation, the computing device architecture 100 includes a read-only memory (ROM) 120 where invariant low-level system code or data for basic system functions such as basic input and output (I/O), startup, or reception of keystrokes from a keyboard are stored in a non-volatile memory device. According to an example implementation, the computing device architecture 100 includes a storage medium 122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files include an operating system 124, application programs 126 (including, for example, a web browser application, a widget or gadget engine, and or other applications, as necessary), and data files 128. According to an example implementation, the computing device architecture 100 includes a power source 130 that provides an appropriate alternating current (AC) or direct current (DC) to power components.

According to an example implementation, the computing device architecture 100 includes a telephony subsystem 132 that allows the device 100 to transmit and receive audio and data information over a telephone network. Although this is shown as a separate subsystem, the telephony subsystem 132 may be implemented as part of the network connection interface 112. The constituent components and the CPU 102 communicate with each other over a bus 134.

According to an example implementation, the CPU 102 has appropriate structure to be a computer processor. In one arrangement, the CPU 102 may include more than one processing unit. The RAM 118 interfaces with the computer bus 134 to provide quick RAM storage to the CPU 102 during the execution of software programs such as the operating system, application programs, and device drivers. More specifically, the CPU 102 loads computer-executable process steps from the storage medium 122 or other media into a field of the RAM 118 in order to execute software programs. Data may be stored in the RAM 118, where the data may be accessed by the computer CPU 102 during execution. In one example configuration, the device architecture 100 includes at least 128 MB of RAM, and 256 MB of flash memory.

The storage medium 122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow a computing device to access computer-executable process steps, application programs and the like, stored on removable and non-removable memory media, to off-load data from the device or to upload data onto the device. A computer program product, such as one utilizing a communication system may be tangibly embodied in storage medium 122, which may include a machine-readable storage medium.

According to one example implementation, the term computing device, as used herein, may be a CPU, or conceptualized as a CPU (for example, the CPU 102 of FIG. 1). In this example implementation, the computing device (CPU) may be coupled, connected, and/or in communication with one or more peripheral devices, such as display. In another example implementation, the term computing device, as used herein, may refer to a mobile computing device such as a smartphone, tablet computer, or smart watch. In this example implementation, the computing device may output content to its local display and/or speaker(s). In another example implementation, the computing device may output content to an external display device (e.g., over Wi-Fi) such as a TV or an external computing system.

In example implementations of the disclosed technology, a computing device may include any number of hardware and/or software applications that are executed to facilitate any of the operations. In example implementations, one or more I/O interfaces may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

Figure 2:
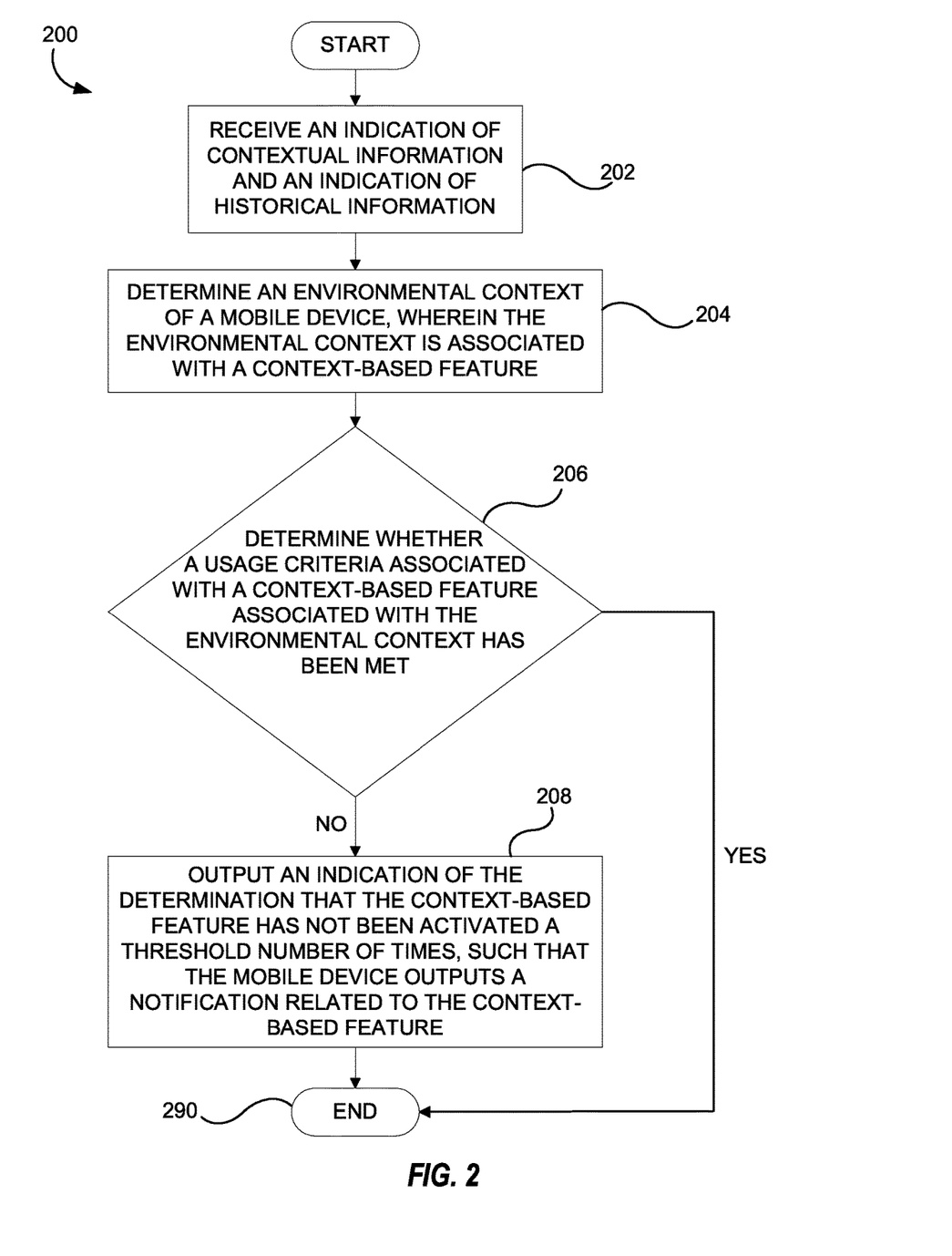
FIG. 2 is a flow diagram of a method 200, according to an example implementation.

FIG. 2 is a flow diagram of a method 200 according to an example implementation of the disclosed technology. The method 200 begins at block 202, where a computing device receives an indication of contextual information and an indication of historical information relating to the computing device and/or of the user of the computing device. At block 204, the computing device can determine an environmental context of a mobile device (i.e., a computing device of a particular user), wherein the environmental context is associated with one or more context-based features of the computing device. In example implementations, the computing device can determine the environmental context of the mobile device in response to receiving the indication of contextual information and the indication of historical information of the user of the computing device. At decision block 206, the computing device can determine from the indication of historical information whether a usage criteria associated with the context-based feature associated with the environmental context has been met.

A usage criteria can be a set of conditions relating to the historical usage of the context-based feature or a related feature. According to some implementations, a usage criteria can include whether the context-based feature has ever been previously activated, the number of times a context-based feature has been activated or used in the past, the number of times the context-based feature has been activated over a specified time frame (e.g., the feature has been activated 3 times in the last 6 months), or whether a similar feature has been activated by the user. It will be understood by those of skill in the art that these examples of usage criteria are merely illustrative and that usage criteria could encompass a wide array of conditions. The usage criteria can be useful in establishing whether or not a user is likely already aware of the context-based feature or whether the user should be notified about the existence of the feature. For example, in some implementations a usage criteria can be whether the context-based feature associated with the environmental context has been activated three or more times in the past.

In example implementations, a computing device can make this determination based on the historical information previously received. According to some implementations, if a computing device determines that the context-based feature has met the usage criteria, then the method can end at block 290, otherwise the method can advance to block 208. At block 208, in response to determining that the context-based feature associated with the environmental context has not met the usage criteria, the computing device can output an indication of the determination that the context-based feature has not met the usage criteria, such that the mobile device annunciates a notification related to the context-based feature. In this way, the mobile device can notify the user about a feature or application of the device that may be useful to the user in the present circumstances (i.e., the present environmental context). According to example implementations, the notification can inform the user of the mobile device about how to use the feature or application of the mobile device. The details of the method 200 will now be described in further detail below.

As previously discussed, in various implementations, the disclosed technology can output for presentation a notification to a user of a mobile device regarding features or applications of the device about which the user may be unfamiliar. According to some implementations, the notification can relate to a feature or application that is context-based (i.e., a feature or application that may be useful based on the particular environmental context of the mobile computing device 300). According to implementations of the disclosed technology, an environmental context can be broadly understood as representing the situation or circumstances of the mobile computing device 300 and/or the user. According to some implementations, a computing device of the disclosed technology, such as a mobile computing device 300 or a remote server, can determine the environmental context of mobile computing device 300 in response to receiving 202 indications of contextual information and indications of historical information.

It will be understood by one of skill in the art that "indications of contextual/historical information" may be used interchangeably with "contextual/historical information," as those of skill in the art will appreciate that computing devices are capable of receiving and processing both information and indications of information as necessary and appropriate. In some implementations, contextual information can be data derived from sensors of mobile computing device 300 that indicate the physical environment of the mobile computing device 300. For example, this may include sensor readings regarding sound from sound interface 116 of FIG. 1, light from ambient light sensor interface 140, imagery from camera interface 114, temperature from thermometer interface 142, movement from accelerometer interface 144, orientation from gyroscope interface 146, location from GPS location interface 148, atmospheric pressure from an atmospheric pressure interface 152 (which can include a barometer), moisture or humidity from a humidity sensor interface 154, and other sensor readings relevant to the current environment of the mobile computing device 300. Further, contextual information can include data derived from monitoring signals of mobile computing device 300 at antenna interface 110, network connection interface 112, or telephony subsystem 132 to obtain information about the user's activities on mobile computing device 300. For example, contextual information may be derived from monitoring text messages, emails, phone calls, or web browsing on mobile computing device 300.

Historical data can be broadly understood to include information relating to a user's past use of features and applications of mobile computing device 300 stored locally in RAM 118 or data files 128 or stored remotely and accessed through network connection interface 112. Historical data can also include other information about the user such as the user's home address, their phone book, social networking connections, past places they have been, their web browsing history, and a wide assortment of other such information. To illustrate these concepts, in one example a user may have conducted an internet search on directions to the library (i.e., historical information), and readings from the accelerometer and GPS on the user's mobile computing device can indicate the location and movement of a user (i.e., contextual information). Based on the historical information of the internet search for directions to the library, a computing device of the present disclosure may be able to predict a user's intent to go to the library. Further, a computing device can determine the user's mode of transportation and heading based on current and historical data acquired from the accelerometer and GPS. Thus, in the foregoing example, the system of the present technology may determine that the user may be traveling (e.g., walking, on a bike, or in a car) on a particular route on their way to the library (i.e., the environmental context).

According to some implementations, a computing device can determine the environmental context of the mobile computing device using the contextual information or a combination of the contextual information and historical information. In the example described above, after the environmental context is determined from historical information and contextual information, the system can provide notifications to the user regarding features and applications of the mobile computing device 300 that are pertinent to the environmental context. For example, the system can provide a notification to the user relating to an interactive library application that may provide hours of operation, floor plans, and a searchable inventory of books.

As described above, in some implementations, a computing device of the disclosed technology can receive contextual information. As discussed, contextual information can be information relating to the physical environment or user activity of the mobile computing device 300 at a given point in time. The physical environment can include, without limitation, whether it is noisy or quiet, whether is it light or dark, whether it is hot or cold, whether it is dry or humid, the ambient pressure, atmospheric conditions such as rain, snow, wind, or cloudiness, as well as the location of mobile computing device 300. According to some implementations, a computing device can obtain information about the physical environment through sensors, such as, for example, an atmospheric pressure sensor which can provide data to the mobile computing device 300 through an atmospheric pressure interface 152. According to some implementations, a computing device of the present disclosure can also obtain information about the physical environment from remote devices, such as servers hosting websites that contain weather information that pertains to the location of the mobile computing device. The location of mobile computing device 300 can be for example, a geographic location (such as GPS coordinates), a semantic location (such as "Georgia Tech campus"), or a particular room in a building. User activity can include an observation of the user's actions derived by sensing and monitoring the mobile computing device 300. For example, user activity may be walking, running, driving, riding a bike, talking on the phone, sitting still, sending text messages, using a web browser to search for a particular item, or any number of other activities of which it may be possible to discern using data and information gathered by one or more computing devices.

Figure 3A:
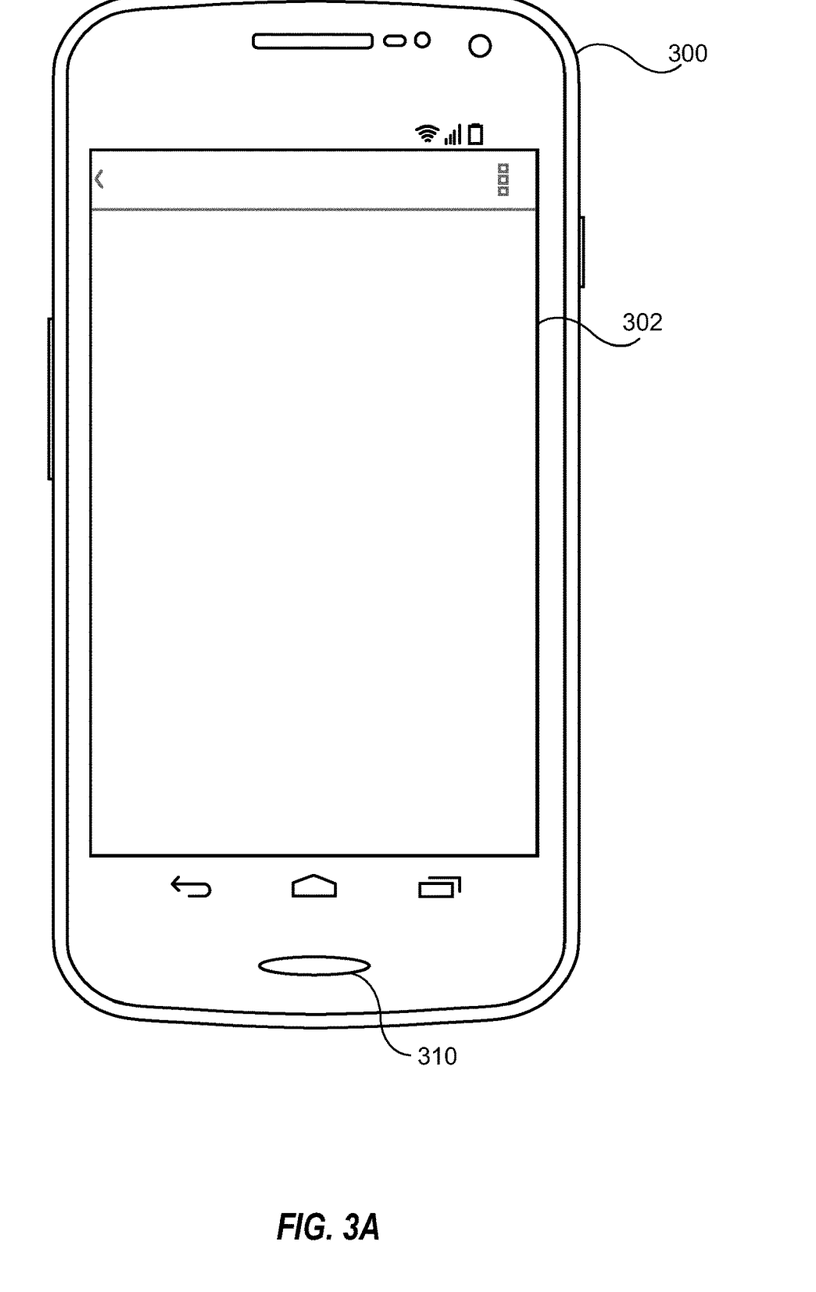
FIG. 3A illustrates a computing device 300, according to an example implementation.

According to some implementations, contextual information can be obtained from sensors and listeners on a mobile computing device that can monitor the activity of a mobile device. FIG. 3A illustrates a mobile computing device 300 according to an example implementation of the disclosed technology, which may include some or all of the components of the computing device 100 shown in FIG. 1. Typically, mobile computing device 300 has a variety of sensors. For example, a display screen 302 of mobile computing device 300 can be an implementation of a presence-sensitive input device 108 of FIG. 1, such as a capacitive touchscreen, which can sense touches on the display screen 302 made by a user. Another sensor of mobile computing device 300 can be an audio input device 310, such as a microphone, for receiving audio or voice commands and providing them to the mobile computing device 300 through sound interface 116 of FIG. 1. Audio input device 310 can also be activated to detect and receive audio data, such as for example, background noise of the environment surrounding mobile computing device 300. Mobile computing device 300 can also include an accelerometer and/or a gyroscope, either of which can be capable of detecting the movement, acceleration, and orientation of mobile computing device 300 and providing sensor readings to mobile computing device 300 through an accelerometer interface 144 and a gyroscope interface 146, respectively. Mobile computing device 300 can also include an optical sensor, such as a light sensor for detection of light, or a camera which can take digital photos or videos and provide data representative of the light, photos, or videos to mobile computing device 300 through an ambient light sensor interface 140 and a camera interface 114, respectively. Mobile computing device 300 can also include a GPS receiver for detecting the geographical position of mobile computing device 300 and can provide GPS data to mobile computing device 300 through a GPS location interface 148.

Mobile computing device 300 can include any number of other sensors that are known in the art, such as, for example, but not limited to, a pressure sensor, a heart rate monitor, a temperature sensor, a vibration sensor, a chemical sensor, or a moisture or humidity sensor. Through the use of a cellular antenna, Bluetooth antenna, or the like, mobile computing device 300 can also be capable of detecting certain other electronic devices within a specified proximity. As will be understood by those of skill in the art, mobile computing device 300 can have various sensor interfaces similar to those in FIG. 1 that are configured to allow the transfer of data from the sensors to the mobile computing device 300. In some implementations, a remote computing device can be capable of activating one or more of the sensors of mobile computing device 300.

It will be understood by those of skill in the art that the presently disclosed technology may utilize a wide array of sensors to actively or passively collect context information about mobile computing device 300 and its surroundings in accordance with the disclosed technology. In addition to obtaining contextual information from the sensors described above, and as described previously, mobile computing device 300 can also obtain contextual information by monitoring information and signals relating to the use of device features, such as the content of mobile applications, text messages, emails, phone conversations and other content that is accessed by a user of mobile computing device 300 (collectively, "application data"). According to some implementations, some or all of the sensor data and application data (collectively, contextual information) may be stored on mobile computing device 300 or on a remote computing device, such as a remote server. Further, according to some implementations, if a user is associated with more than one device, all data associated with a user can be associated with a user profile which can enable centralized monitoring of the user's activity across all devices, and thus, any sensor or application data gathered from one device can be accessed by the other related devices. For example, if a user visits a website on a home computer associated with the user's profile, the user's mobile computing device 300 can receive data relating to the user's visit to the website. According to some implementations, data from all of a user's devices may be associated with a user profile. According to some implementations, data from some or all of a user's devices may be stored on mobile computing device 300 or on a remote server.

As described above, before determining an environmental context and generating a notification, a computing device of the disclosed technology can receive historical information relating to the user of the computing device. In some implementations, historical information, which may be stored in RAM 118, on a remote computing device and/or on a cloud server, can broadly include records of a user's past usage of features and applications of mobile computing device 300, as well as other information about the user such as their home address, their phone book, social networking connections, past places they have been to, their web browsing history and a wide assortment of other such information. For example, historical information might include an indication that a user has performed an internet search attempting to locate a particular book for purchase. Historical information can also include whether a user has previously accessed or used a particular feature or application of mobile computing device 300. For example, historical information might include an indication that the user has never accessed an image capture application of mobile computing device 300. In some implementations, historical information can include how many times and/or how often a user has activated a particular feature or application of mobile computing device 300. According to some implementations, a computing device of the disclosed technology can monitor usage of a mobile computing device 300 and store historical information based on the monitored activity. In some implementations, the historical information of the user of the computing device can be stored on a remote computing device. In some implementations, the historical information obtained from monitoring the use of mobile computing device 300 can be combined with historical information of other devices associated with a user's user profile.

In accordance with some implementations of the disclosed technology, before generating a notification, a computing device can determine an environmental context of mobile computing device 300 in response to receiving an indication of contextual information and an indication of historical information of the user of the computing device. As noted previously, the environmental context of mobile computing device 300 can broadly represent the situation or circumstances of the mobile device and the user. According to some implementations, a variety of different environmental contexts can be derived from different combinations of contextual information and historical information. As noted previously in an example situation, the system can use contextual information such as GPS and accelerometer readings paired with historical information such as an internet search of a route to the library to determine that the environmental context of the example is that a user is riding a bike to the library. In another example situation, the system may use contextual information including time from a device's clock, darkness from the mobile device's optical sensor, and/or the sound of snoring detected by a device's microphone, as well as the historical data of the user's past heart rate and movement data that indicates the user tends to be asleep during the pertinent time period to determine that the contextual environment of the example situation may be that the user is asleep and does not wish to be disturbed by phone calls. In this case, in the event of an unwanted call while the user is asleep, the system may generate a notice regarding a feature that allows the user to silence the mobile device when the user is asleep. Thus, as will be understood, each particular environmental context may be determined by a different set of contextual information and historical information. According to some implementations, the environmental context of mobile computing device 300 can be determined by a context manager. In some implementations, a context manager can be an application that can collect contextual information and historical information from one or more devices used by the user, to determine the environmental context of mobile computing device 300.

After an environmental context is determined, a computing device 100 according to the present disclosure may identify a context-based feature suitable for use in the environmental context prior to generating a notification. Context-based features and applications can be features and applications that have usefulness under a particular set of circumstances. As previously described above, the environmental context of mobile computing device 300 can be associated with one or more context-based features or applications of mobile computing device 300 that are suitable for use in the environmental context. Accordingly, in some implementations, a notification generated and output on mobile computing device 300 can relate to a context-based feature or application that is associated with the current environmental context. In this way, the user can be notified about a context-based feature or application that may be beneficial to use at the time and place of notification (i.e., when the user is present in the environmental context to which the context-based feature or application applies).

A context-based feature may relate to a particular time, place, or set of circumstances. For example, an application that allows a user to share content from the user's device with other devices using a Bluetooth connection may only be useful in the circumstance where other Bluetooth-enabled devices belonging to people a user desires to share content with are within an adequate proximity to the user's device. Thus, in the foregoing example, a system of the present disclosure ideally would know historical information and contextual information such as: 1) that the user desires to share content with others via the application, 2) the identities of associated people and devices that the user wishes to share content with, and 3) whether any such associated people and devices are within range of the Bluetooth signal of mobile computing device 300. According to this example, the system would require historical information indicative of the user's friends and family who the user desires to share content with, and contextual information indicating whether any such person is currently within Bluetooth proximity to the user's mobile computing device 300. Accordingly, upon receiving the pertinent contextual information and historical information and upon determining the corresponding environmental context, the computing device can cause a notification to be presented to the user to inform the user of the Bluetooth sharing feature, such that the user may be in a position to utilize the feature at the time of notification.

Another example of a context-based application may be an application that allows a user to passively disable an electronic locking mechanism of mobile computing device 300 when the user is at home ("smart lock"). In this case, the environmental context would be that the user is at home and the user desires to access the contents of a mobile computing device 300 (as indicated by the user's attempt to unlock mobile computing device 300). Thus, in the foregoing example, a system of the present disclosure ideally would know historical information and contextual information such as: 1) that the user desires to access contents of their mobile device when it home, 2) where the user's home is, and 3) when the user is at home. This could be implemented with the knowledge of the historical information of the user's home location and the contextual information of the user's current location. In accordance with some implementations, the system may generate a notification to inform the user about the smart lock feature upon observing the user attempting to unlock the mobile device at home. As will be understood by those of skill in the art, there can be a vast array of context-based features of a mobile device that can require a variety of different historical information and contextual information to function.

In accordance with implementations of the disclosed technology, before generating a notification related to a context-based feature, the computing device can determine (206 from FIG. 2) whether a context-based feature fails to meet a usage criteria. As will be appreciated, determining, for example, that the user has already activated the feature in the past (e.g., an example usage criteria) may allow the computing device to avoid generating notifications regarding features and applications for which the user is already aware. Thus, according to some implementations, no notification relating to a context-based feature of mobile computing device 300 will be generated if the user's past use of the context-based feature meets the usage criteria. Thus, in some implementations, when determining whether or not a notification will be generated, the method may first determine whether a usage criteria has been met. Examples of a usage criteria can include, but are not limited to, the number of times the a context-based feature has been accessed by the user, the frequency with which the context-based feature has been accessed, or the time elapsed since the context-based feature was last accessed. For example, in some implementations, if the user has accessed the context-based feature multiple times, the method may nonetheless generate a notification to the user if the last time the context-based feature was accessed was over a year ago.

Figure 3B:
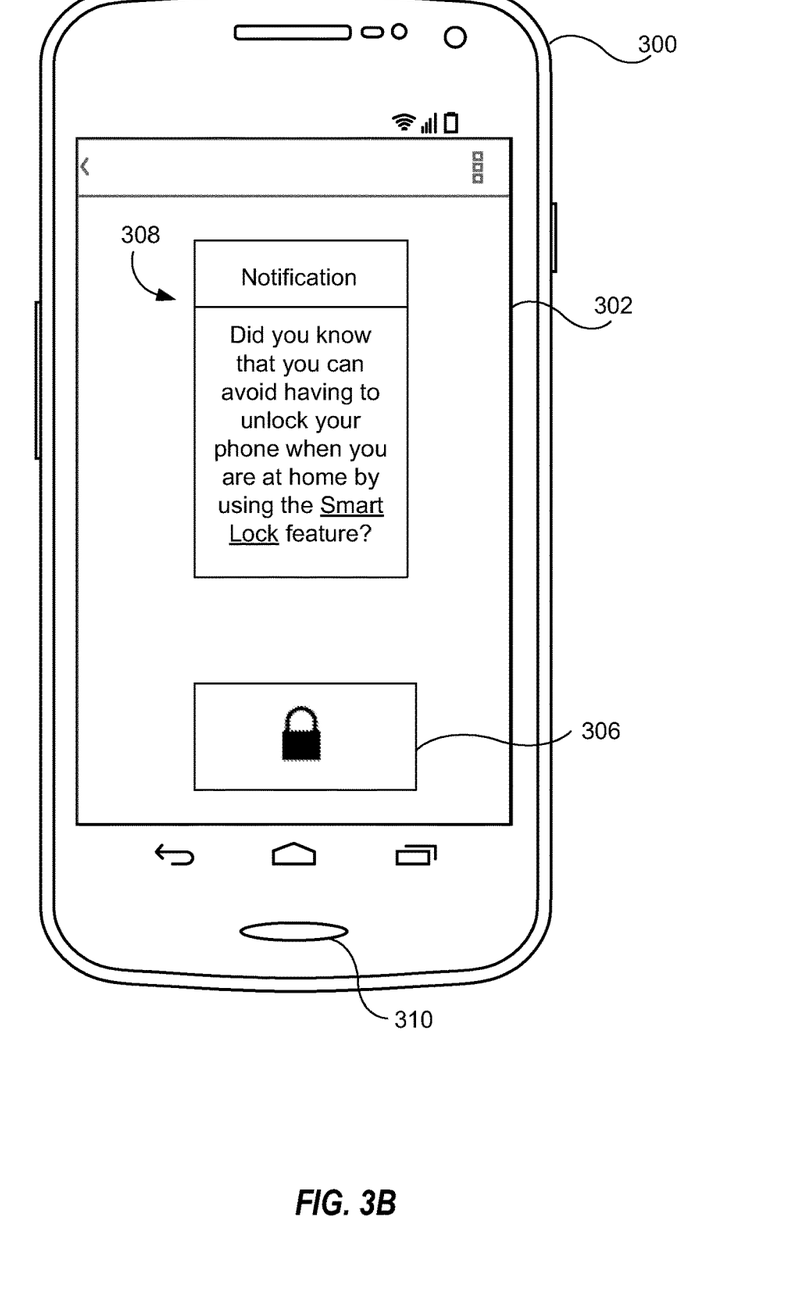
FIG. 3B illustrates a computing device 300 with a notification relating to a context-based feature that is output for display, according to an example implementation.

An example implementation of the disclosed technology will now be described with respect to the previously described smart lock context-based feature. As will be understood, a smart lock feature can passively disable a locking function of mobile computing device 300 when mobile computing device 300 is at the user's home, such that a user may access the contents of mobile computing device 300 without having to first unlock it. Thus, in an example implementation, a computing device receives an indication of historical information, wherein the historical information could include the location of the user's home (e.g., as previously specified by the user or obtained from the user's address book), as well as the user's history indicating whether the user has ever accessed or used the smart lock before. The computing device could further receive an indication of contextual information which would include the current location of mobile computing device 300, as determined by, for example, the GPS coordinates of the device or that the device is within WiFi range of a home access point. The indication of contextual information can also include an indication that the user is attempting to access content on mobile computing device 300. The computing device can then determine the environmental context of mobile computing device 300 from the historical information and the contextual information, which in this case can be along the lines that "the user is at home and desires to access content on the mobile device." The environmental context of the user being at home and desiring to access content on the device is associated with the context-based feature of the smart lock feature because that feature becomes useful in that environmental context. Next, based on the indication of historical information previously received, the computing device can determine whether the user has previously activated the smart lock feature or not. According to some implementations, if the computing device determines that the user has not accessed the smart lock feature before, then it can cause a notification relating to the smart lock feature to be generated on mobile computing device 300. In some implementations, the notification may be designed to inform the user about the existence of the smart lock feature. For example, as shown in FIG. 3B, the mobile computing device 300 may output a notification 308 in response to a user attempting to unlock the mobile device's lock 306 while at home.

According to some implementations, a notification may be a message that is presented on the screen 302 of mobile computing device 300. The message can be designed to inform the user of the existence of the context-based feature or application of mobile computing device 300. According to some implementations, the message may provide a link to the context-based feature of mobile computing device 300 that can allow the user to easily access the context-based feature on mobile computing device 300. In some implementations, the message may include an overview of the functionalities and usefulness of the context-based feature. In some implementations, the message may include a tutorial designed to show the user how to use or set up the context-based feature. Further, in some implementations the message may provide a link to an external website that can provide more information regarding the context-based feature. In some implementations, a notification can be audible. For example, mobile computing device 300 may emit a sound such as a ring or a beep. In some implementations, a notification can be tactile. For example, mobile computing device 300 can vibrate.

According to some implementations, it may be desirable to avoid notifying a user of a feature or application before the user has had adequate time to explore the features and applications of the mobile computing device 300. Thus, according to some implementations, aspects of the present disclosure may further include a step of, after determining that a usage criteria associated with the feature has not been met, but before causing a notification to be generated, determining whether mobile computing device 300 has been in the particular environmental context more than a threshold number of times. In other words, usage criteria may have both minimum and maximum parameter values or more than one range of parameter values. In some implementations, the computing device may compare the number of times the mobile device has been in the environmental context to a particular notification threshold and may only output an indication of the determination that the context-based feature has not met the usage criteria upon exceeding the notification threshold. For example, in the case of the smart lock described above, there may be a notification threshold of ten attempts to unlock the mobile computing device while at the user's home. In other words, in this implementation, the method may not notify the user of the smart lock feature upon the first time the user attempts to unlock mobile computing device 300 at home, but would wait until the eleventh time the user attempts to unlock mobile computing device 300 at home before causing a notification to be sent. In some implementations, each context-based feature may have a different notification threshold. As will be appreciated, incorporating a threshold or providing additional restraints on how soon a notification can be sent to a user about a particular context-based feature may allow users time to explore features of their mobile computing devices on their own and prevent overwhelming users with notifications when their mobile computing devices are new. In some implementations, the notification threshold may reset after the notification is generated. For example, in the previously described case of the smart lock feature having a notification threshold of ten, after the eleventh attempt at unlocking the phone at home the system can generate a notification, but if the user does not respond to the notification or access and activate the smart lock feature, the system may generate another notification relating to the smart lock feature after the next eleven unlock attempts.

According to some implementations, aspects of the present disclosure may have additional steps to prevent notifications from overwhelming a user with notifications about available features and applications. In some implementations of the disclosed technology, the number of notifications that may be provided to the user over a specified time frame may be limited by a notification limit. For example, in some implementations, a notification limit of two may limit the number of notifications to two notifications per month. If the number of notifications is so limited, in some implementations, potential notifications in excess of that number can simply be temporarily discarded. For example, in some implementations a notification in excess of the limit may be discarded and will only be generated upon the next time the mobile computing device 300 enters the required environmental context relating to the context-based feature that was the subject of the notification. In some implementations, a notification in excess of the limit may be delayed and presented to the user at the expiration of the specified time frame. In some implementations, the notification in excess of the limit may be saved to mobile computing device 300 and may be accessible by a user at their own discretion. In some implementations, a notification limit may limit the number of times the system notifies a user about a particular context-based feature. For example, in some implementations the system may only display a notification about a particular context-based feature twice and then never again.

According to some implementations, the disclosed technology can incorporate data from other users to improve the notification process. In some implementations, the system can collect information across all users regarding notifications made to users, as well as the users' subsequent responses to those notifications to determine which notifications are more likely to result in a user utilizing the context-based feature that is the subject of the notification. The system can then prioritize which context-based features to notify a user about first. Furthermore, in some implementations, the system can adjust a threshold used to determine when to send a notification to a user based on the rate of user adoption of the context-based feature. For example, if a particular context-based feature is used by a high rate of users after receiving a notification, the system may reduce the threshold required to be met before notifying a user who has not yet been notified of the context-based feature. In this way, the system can more actively promote context-based features that a user is more likely to want to use, thereby making the notification process less intrusive to the user.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A computer-implemented method comprising:
receiving, by a computing device, an indication of contextual information and an indication of historical information of a user of the computing device;
responsive to receiving the indication of contextual information and the indication of historical information of the user of the computing device, determining, by the computing device, an environmental context of a mobile device, wherein the environmental context is associated with one or more context-based features of the computing device;
receiving, by the computing device, an indication of an adoption rate of the one or more context-based features by other users after receiving a notification regarding the one or more context-based features;
determining, based on the received indication of the adoption rate, a prioritization of a notification of the one or more context-based features;
determining, based on the historical information and the prioritization, whether a usage criteria associated with a context-based feature associated with the environmental context has been met;
determining that the usage criteria has not been met in response to determining, by the computing device, that the mobile device has been in the environmental context a number of times greater than a notification threshold; and
responsive to determining that the usage criteria associated with the context-based feature associated with the environmental context has not been met, outputting, by the computing device, an indication of the determination that the usage criteria has not been met, such that the mobile device outputs a notification related to the context-based feature.

2. The method of claim 1, wherein the computing device and the mobile device are the same device.

3. The method of claim 1, wherein the notification related to the context-based feature comprises instructions on how to use the context-based feature of the mobile device.

4. The method of claim 1, further comprising:
determining that the usage criteria has not been met in response to determining, by the computing device, that a notification relating to the context-based feature has not been previously provided by the mobile device more than a threshold number of times.

5. The method of claim 1, wherein the usage criteria includes one of:
the context-based feature has been accessed a number of times previously;
the context-based feature has been accessed a number of times previously within a specified time frame; or
a feature similar to the context-based feature has been accessed previously.

6. The method of claim 1, wherein the historical information of the user comprises:
information indicative of the extent of which a particular feature or application of the device has been activated in the past.

7. The method of claim 1, wherein the environmental context of a mobile device comprises at least one of:
the location of the mobile device;
an activity being performed by the user of the mobile device; or
a predicted state of the mobile device.

8. A system comprising:
one or more processors;
a memory coupled to the one or more processors and storing instructions that, when executed by the one or more processors, cause the system to:
receive, an indication of contextual information and an indication of historical information of a user of a mobile computing device;
responsive to receiving the indication of contextual information and the indication of historical information of the user of the mobile computing device, determine, based on the contextual information and the historical information, an environmental context of the mobile computing device, wherein the environmental context is associated with one or more context-based features of the mobile computing device;
receive an indication of an adoption rate of the one or more context-based features by other users after receiving a notification regarding the one or more context-based features;
determine, based on the received indication of the adoption rate, a prioritization of a notification of the one or more context-based features;
determine, based on the historical information and the prioritization, whether a usage criteria associated with the context-based feature associated with the environmental context has been met;
determine that the usage criteria has not been met in response to determining that the mobile device has been in the environmental context a number of times greater than a notification threshold; and
responsive to determining that the usage criteria associated with the context-based feature associated with the environmental context has not been met, output an indication of the determination that the usage criteria associated with the context-based feature has not been met, such that the mobile computing device outputs a notification related to the context-based feature.

9. The system of claim 8, wherein the notification related to the context-based feature comprises instructions on how to use the context-based feature of the mobile computing device.

10. The system of claim 8, further comprising a GPS receiver, wherein the indication of contextual information relates to location data received from the GPS receiver.

11. The system of claim 8, further comprising an accelerometer, wherein the indication of contextual information accelerometer relates to data received from the accelerometer.

12. The system of claim 8, further comprising a network connection interface, wherein the indication of contextual information relates to data received from the network connection interface.

13. The system of claim 8, further comprising a microphone, wherein the indication of contextual information relates to sound data received from the microphone.

14. The system of claim 8, further comprising an optical sensor, wherein the indication of contextual information relates to image data received from the optical sensor.

15. The system of claim 8, wherein the indication of contextual information relates to application data of an application running on the mobile computing device detected by a listener.

16. The system of claim 8, further comprising an ambient light sensor, wherein the indication of contextual information relates to light data received from the ambient light sensor.

17. A non-transitory computer-readable medium storing instructions that, when executed by one or more processors, cause a computing device to:
receive an indication of contextual information and an indication of historical information of a user of a mobile computing device;
responsive to receiving the indication of contextual information and the indication of historical information of the user of the mobile computing device, determine an environmental context of the mobile computing device, wherein the environmental context is associated with one or more context-based features of the mobile computing device;
receive an indication of an adoption rate of the one or more context-based features by other users after receiving a notification regarding the one or more context-based features;
determine, based on the received indication of the adoption rate, a prioritization of a notification of the one or more context-based features;
determine, based on the historical information and the prioritization, whether a usage criteria associated with the context-based feature associated with the environmental context has been met;
determine that the usage criteria has not been met in response to determining that the mobile device has been in the environmental context a number of times greater than a notification threshold; and
responsive to determining that the usage criteria associated with the context-based feature associated with the environmental context has not been met, output an indication of the determination that the usage criteria has not been met, such that the mobile computing device outputs a notification related to the context-based feature.

18. The non-transitory computer-readable medium of claim 17 further storing instructions that, when executed by the one or more processors, cause a computing device to:
prior to outputting an indication of the determination that the context-based feature has not met the usage criteria, determine that a notification relating to the context-based feature has not been previously provided by the mobile computing device.

19. A system comprising:
one or more processors;
a memory coupled to the one or more processors and storing instructions that, when executed by the one or more processors, cause the system to:
receive, at a first time, a first indication of contextual information and an indication of historical information of a user of a mobile computing device;
responsive to receiving the first indication of contextual information and the indication of historical information of the user of the mobile computing device, determine, based on the first contextual information and the historical information, a first environmental context of the mobile computing device, wherein the first environmental context is associated with one or more context-based features of the mobile computing device;

determine, based on the historical information, whether a usage criteria associated with the context-based feature associated with the first environmental context has been met;

determine a number of notifications provided by the mobile computing device over a predetermined time frame based on the first time; and responsive to determining that the usage criteria associated with the context-based feature associated with the first environmental context has not been met and the number of notifications provided by the mobile computing device over the predetermined time frame based on the first time being less than a notification limit, output an indication that the context-based feature has not met the usage criteria, such that the mobile computing device outputs a notification related to the context-based feature.

20. The system of claim 19, wherein the instructions, when executed by the one or more processors, further cause the system to:

responsive to determining that the usage criteria associated with the context-based feature associated with the first environmental context has not been met and the number of notifications provided by the mobile computing device over the predetermined time frame being greater than or equal to the notification limit, delay output of the indication that the context-based feature has not met the usage criteria, such that the mobile computing device does not output a notification related to the context-based feature;

receive, at a second time, a second indication of contextual information;

responsive to receiving the second indication of contextual information, determine, based on the second contextual information and the historical information, a second environmental context of the mobile computing device, wherein the second environmental context is associated with one or more context-based features of the mobile computing device;

determine an updated number of notifications provided by the mobile computing device over the predetermined time frame based on the second time; and responsive to determining that the usage criteria associated with the context-based feature associated with the environmental context has not been met and the updated number of notifications provided by the mobile computing device over the predetermined time frame based on the second time being less than the notification limit, output an indication that the context-based feature has not met the usage criteria, such that the mobile computing device outputs a notification related to the context-based feature.

21. The system of claim 19, wherein the instructions, when executed by the one or more processors, further cause the system to:

responsive to determining that the number of notifications provided by the mobile computing device over the predetermined time frame based on the first time is greater than or equal to the notification limit, discard the determination of whether the usage criteria associated with the context-based feature associated with the environmental context has been met.

22. The system of claim 19, wherein the notification limit is a number of notifications per month.

* * * * *